United States Patent
Uskali et al.

[11] Patent Number: 5,440,208
[45] Date of Patent: Aug. 8, 1995

[54] DRIVER CIRCUIT FOR ELECTROLUMINESCENT PANEL

[75] Inventors: Robert G. Uskali, Schaumburg, Ill.; David B. Bell, Los Altos, Calif.; Wilson D. Pace, Tempe, Ariz.

[73] Assignee: Motorola, Inc., Schaumburg, Ill.

[21] Appl. No.: 145,919

[22] Filed: Oct. 29, 1993

[51] Int. Cl.6 .............................. G09G 3/10
[52] U.S. Cl. ................... 315/169.3; 315/307; 315/308; 315/314; 315/291; 315/DIG. 4
[58] Field of Search ............... 315/307, 308, 314, 158, 315/169.3, 194, 247, 291, DIG. 4, DIG. 7; 340/781, 811

[56] References Cited
U.S. PATENT DOCUMENTS

| | | | |
|---|---|---|---|
| 4,107,747 | 9/1978 | Holmes | 315/307 |
| 4,277,728 | 5/1978 | Stevens | 315/307 |
| 4,443,741 | 9/1981 | Tanaka et al. | 315/307 |
| 4,527,095 | 2/1984 | Kindlmann | 315/169.3 |
| 4,769,753 | 7/1987 | Knudson et al. | 363/60 |
| 4,845,489 | 12/1985 | Hormel | 340/811 |
| 4,982,142 | 1/1991 | Pace et al. | 315/169.3 |
| 5,027,040 | 6/1991 | Ikeda et al. | 315/241 R |
| 5,345,146 | 9/1994 | Koenck et al. | 315/169.3 |

*Primary Examiner*—Robert J. Pascal
*Assistant Examiner*—Haissa Philogene
*Attorney, Agent, or Firm*—Charles W. Bethards

[57] ABSTRACT

An electronic device (100) is disclosed including an electroluminescent (EL) backlight panel (140) and an EL driver circuit (210). The EL driver circuit (210) provides power to the EL backlight (140), as well as panel aging compensation and user adjustment capabilities. The EL driver circuit (210) is low-cost, small-size, and designed in such a way to be easily integrated into a custom integrated circuit. A method is provided for controlling and converting power to the EL backlight panel (140).

23 Claims, 5 Drawing Sheets

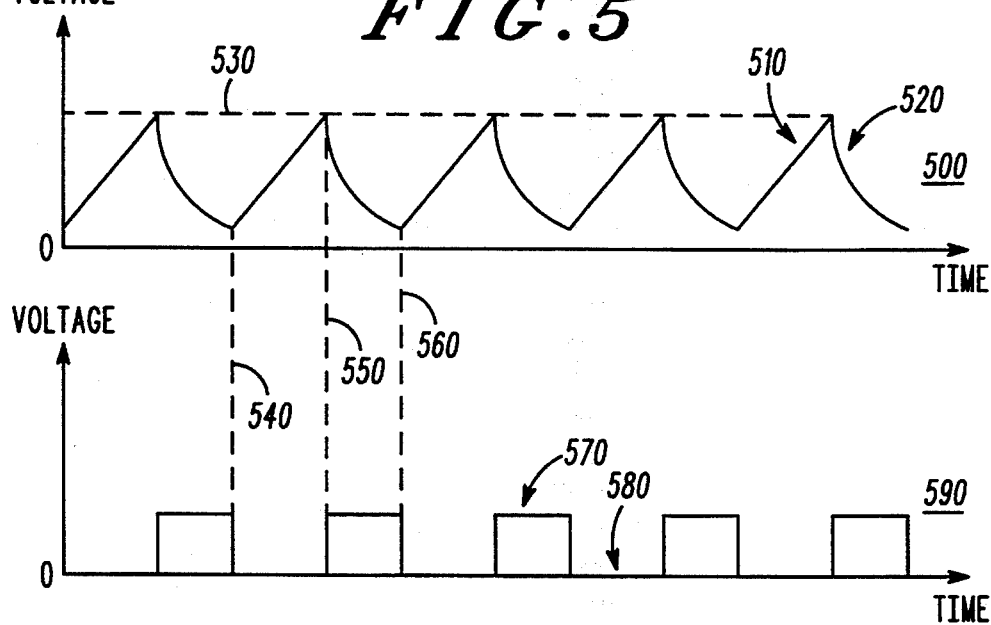
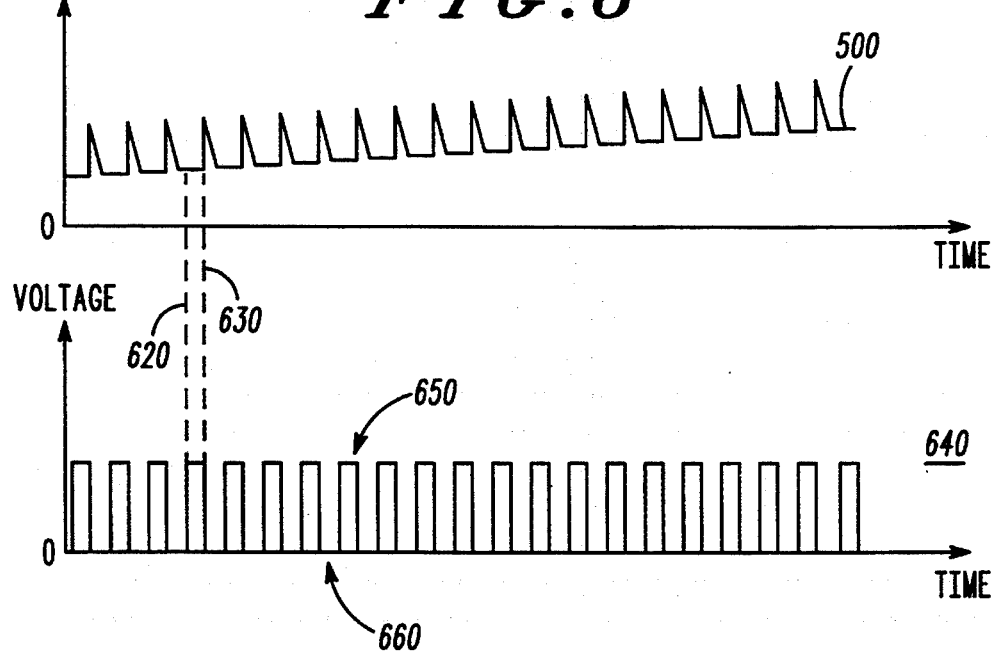

DRIVER CIRCUIT FOR ELECTROLUMINESCENT PANEL

TECHNICAL FIELD

This disclosure relates generally to driver circuits for backlight panels and more specifically to a driver circuit for converting and controlling power to an electroluminescent backlight panel.

BACKGROUND OF THE INVENTION

With the advent of mobile data processing and communications, the necessity of a highly readable, user-friendly operator interface has become apparent. One solution that meets this need for portable electronic devices is a flat panel liquid crystal display (LCD) in tandem with electroluminescent (EL) backlighting. Inherent in this selection is the problem of providing a high-voltage alternating current (AC) power source, derived from a relatively low voltage battery, to the electroluminescent backlight panel.

Typically the solution to this problem requires a large transformer to drive the EL panel due to a high drive voltage and low panel drive frequency requirements. The requirement that a large transformer be used in conventional driver circuit designs makes EL backlighting undesirable as a choice for LCD backlighting, due to the size, cost, and weight requirements of portable electronic devices. In addition, providing the user with the capability of adjusting the backlight brightness is essential for the wide array of usage environments that most portable electronic devices encounter. Electroluminescent backlight panels also exhibit undesirable aging characteristic that cause the luminance of the EL panel to decrease over time, due to the decrease in the panel capacitance.

The art has shown EL driver circuits using high-frequency switching converters to step up the drive voltage, thereby avoiding the use of a large transformer. Art has also shown aging compensation and user adjustment features. To be effective in a portable product, all of these requirements must be met. That one or more requisite attributes is lacking in all of the known and contemplated products has been shown. These feature can not merely be combined, but must be combined in a way that the resultant driver circuit can be easily implemented in a custom integrated circuit, in order to meet the cost and size requirements of a portable electronic device.

Clearly, a long felt need exists for an electroluminescent backlight panel driver circuit that is small and light-weight for application in portable electronic devices. Combined with the added enhancements of automatic aging compensation and user adjustment capability, a driver circuit that provides these advantages is absolutely required in the portable product arena.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

FIG. 5 is a timing diagram of the panel drive frequency generator output and the resultant voltage measured across the electroluminescent panel in accordance with a preferred embodiment of the invention.

FIG. 6 is a timing diagram of the pulse-width modulation circuit output and the resultant voltage measured across the electroluminescent panel in accordance with a preferred embodiment of the invention.

DETAILED DESCRIPTION OF A PREFERRED EMBODIMENT

Generally the present invention provides an apparatus and method of providing power to an electroluminescent (EL) backlight panel in a portable environment where small size, light weight, and low power consumption are requirements. Additional advantages provided by the present invention are the capability for user adjustment and automatic compensation for aging characteristics of the electroluminescent panel. These advantages are accomplished by an inventive configuration, including a high frequency Pulse-Width Modulation (PWM) based driver circuit which performs a DC-to-AC voltage conversion. The DC power source, typically a battery, is configured with the PWM based driver circuit in either a boost or flyback power converter configuration in order to provide a step-up voltage function, which is repeated at the desired electroluminescent backlight panel operation period. The electroluminescent backlight panel is driven in an efficient means by the PWM based driver circuit, which is controlled via a feedback means to the pulse-width modulation circuit. The pulse-width modulation circuit output provides pulses of varied widths, thereby controlling brightness through a regulating means and user input.

Figure 1:
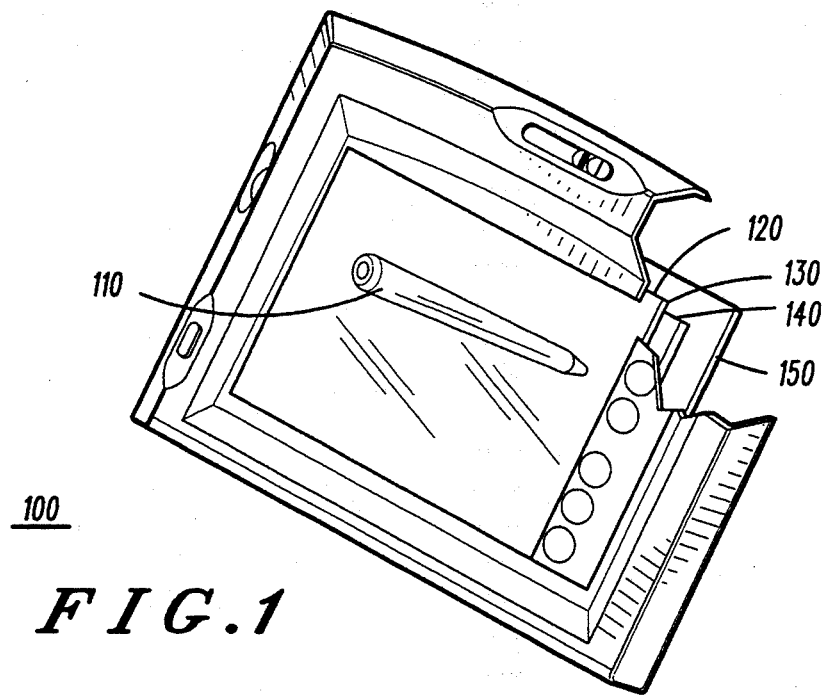
FIG. 1 shows a perspective view of an electroluminescent panel in an electronic device.

The present invention can be more fully described and appreciated with reference to the Figures in which FIG. 1 is a perspective view of an electronic device (100) having an electroluminescent backlight panel (140). The electronic device (100) includes a touchscreen panel (120) for user input, a Liquid Crystal Display (LCD) panel (130) for displaying information to the user, and an EL backlight panel (140) for improving the brightness and readability of LCD panel (130). The electronic device (100) also includes a Printed Circuit Board (PCB) (150) that contains a computer and additional electronic devices that comprise one embodiment of the present invention. The stylus (110) may be used to input information via the touchscreen panel (120). In a preferred embodiment, the electronic device may be a portable computing device, such as a notebook computer or an electronic organizer.

Figure 2:
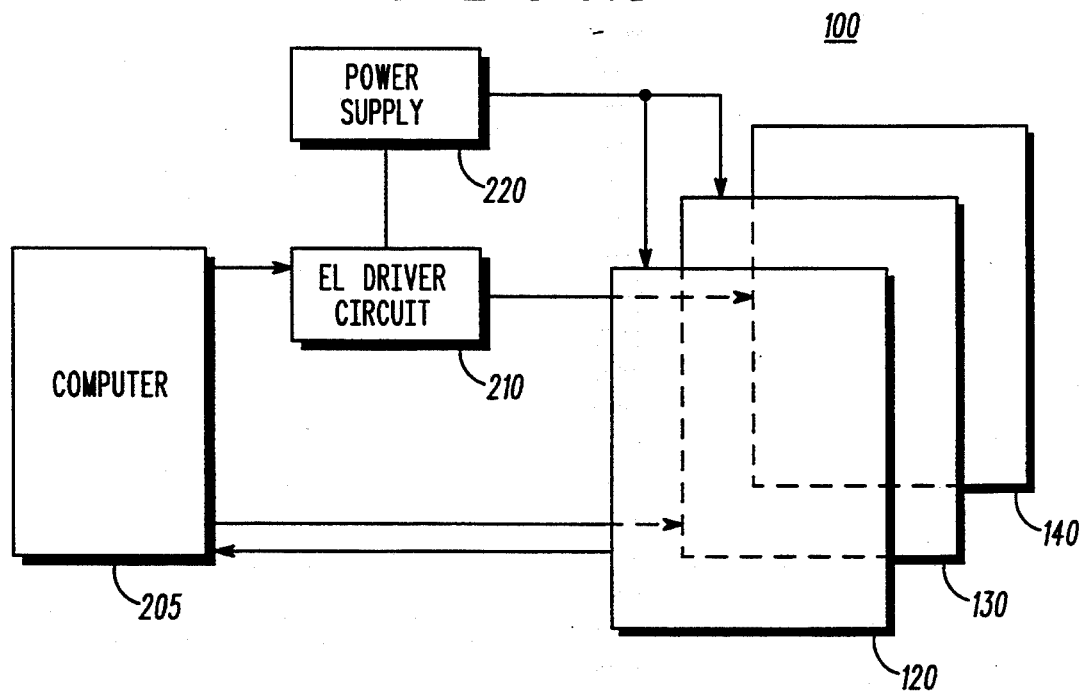
FIG. 2 is a block diagram of an electronic device in accordance with one embodiment of the present invention.

FIG. 2 is a general block diagram of an electronic device having a electroluminescent backlight panel (140). The user interface of the electronic device (100) is comprised of the touchscreen panel (120), the LCD panel (130), and the electroluminescent backlight panel (140). User input is processed by the computing device (205), which also provides output to the user via the user interface or other non-user interface functions. The power supply (220), typically includes a battery and provides power to the various sub-systems of the electronic device (100). The power supply (20) is also responsible for supplying the appropriate voltage to an EL driver circuit (210). The EL driver circuit (210) provides appropriate waveforms at the electroluminescent backlight panel (140) in order to provide backlighting to the user display in an efficient controlled manner.

Figure 3:
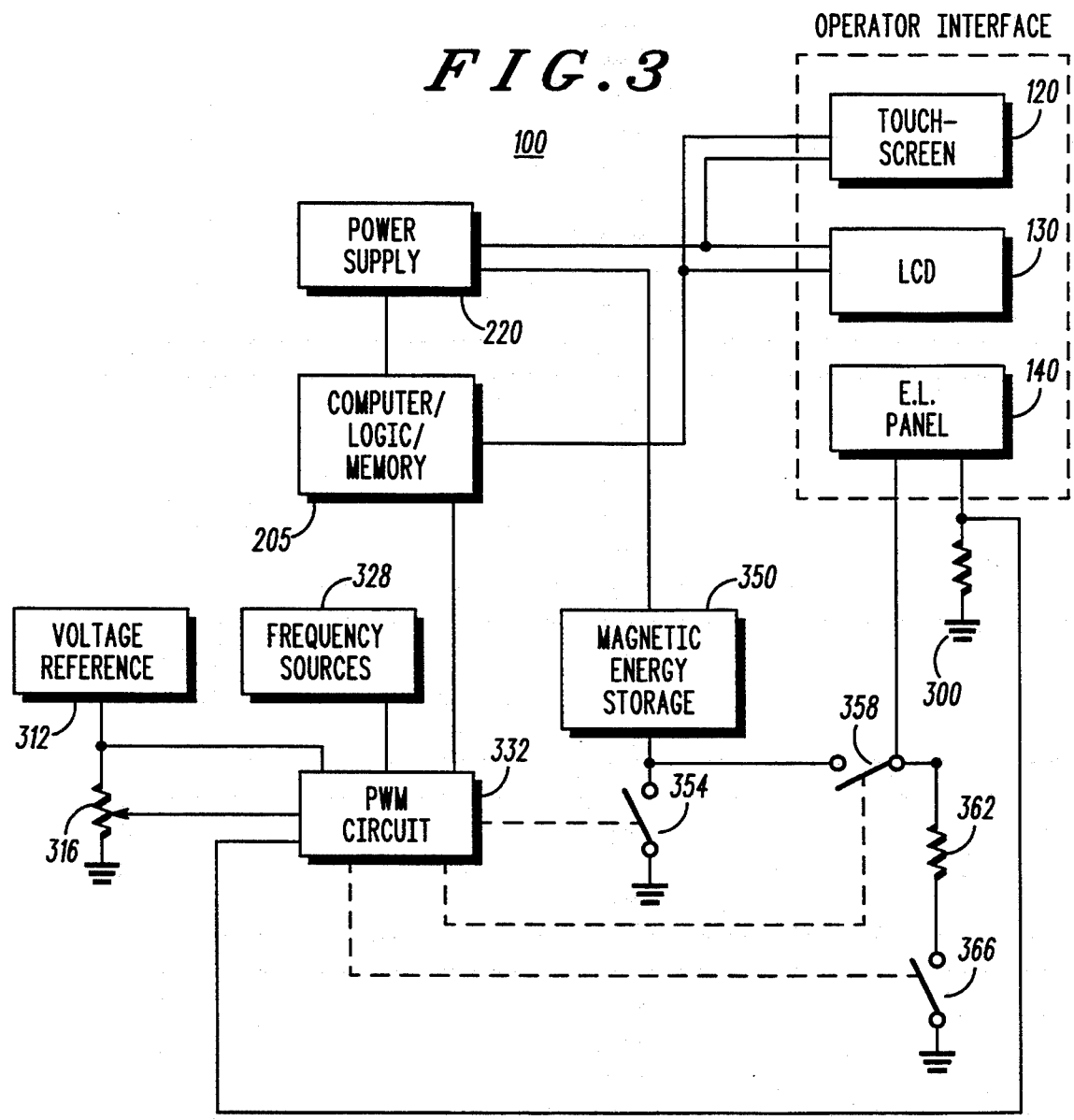
FIG. 3 shows a block diagram of the driver circuit for an electroluminescent panel for use in an electronic device in accordance with one embodiment of the invention.

With reference to FIG. 3 in which like reference numerals refer to like elements from FIGS. 1 and 2, a more detailed description of the electronic device and the EL driver circuit (210) is now provided. Shown in FIG. 3, the operator interface is comprised of the touchscreen (120), LCD (130), and electroluminescent backlight panel (140). The operator interface is powered and controlled from the power supply (220) and computer (205) respectively. As an overview the EL driver circuit (210) includes a pulse width modulation circuit (332) coupled to a voltage reference (312), a frequency source (328), an apparatus for storing magnetic energy (350), various switching functions (354, 358, and 366), and the E1 panel (140). A large part of the EL driver circuit is a DC to AC converter that is comprised of the voltage reference (312), frequency sources (328), pulse-width modulation (PWM) circuit (332), and the apparatus for storing magnetic energy (350), such as an inductor or transformer all intercoupled as depicted. This converter receives input DC power from the power supply (220) and provides an AC signal or voltage that drives the EL panel. The generation of this AC signal and its various parameters are carefully controlled by the PWM circuit (332) using various switching functions (354, 358, 366).

As an overview this arrangement is a driver circuit that converts and controls power to the EL panel and includes a pulse-width modulation circuit (P/O 332) that provides a modulated pulse train and has an enable input and an adjustable pulse width, a panel drive frequency generator (P/O 332) that is electrically coupled to the pulse-width modulation circuit and provides a panel drive frequency and a signal to the enable input that disables the modulated pulse train, an apparatus (350) for storing magnetic energy that is electrically coupled to a power supply (220), selectively responsive to the modulated pulse train, via swithing circuit (354), and selectively coupled to the EL panel (140) via switching function (358) for the purpose of transferring energy from the apparatus for storing magnetic energy to the electroluminescent panel, a discharge switching apparatus (366), responsive to the panel drive frequency generator for discharging or draining the energy from the EL panel, and a feedback system that responds to the panel drive frequency generator and resets an initial state of the pulse-width modulation circuit.

The PWM circuit (332) is the core of the EL driver circuit and the converter system. A modulated pulse width control signal is applied to switching function (354) from the PWM circuit (332) which provides the regulation and brightness control of the DC to AC converter. The switching function (354) is closed during the first part of a voltage boost cycle, allowing a required amount of current or energy to be stored in the apparatus for storing magnetic energy (350) to provide the desired regulated output. During this portion of a high frequency cycle, the switching means (358) and (366) are open precluding current flow in their, respective paths.

As the voltage step-up process continues, and switching means (354) opens, switching means (358) closes and allows the energy stored in the magnetic device to be transferred to the electroluminescent backlight panel (140). Switching means (366) remains open during this portion of the cycle. With switching means (354) open and switching means (366) closed, a current flows through the panel and the resistor (300) resulting in a net increase in the voltage measured across EL panel (140). Repeated cycles of this type will have the affect of "stepping up" the panel voltage in a linear ramp as taken over the average.

The current which passes through resistor (300) creates a voltage which is returned to the feedback input of the PWM circuit (332). The voltage across resistor (300) is proportional to the current flowing through the electroluminescent backlight panel (140) thereby providing a means for current-controlled PWM regulation. The switching means (358) may be implemented as a transistor switch controlled by the PWM circuit or a properly selected diode.

When the desired half period of the EL panel (140) is reached as indicated by one of the frequency sources (328), the voltage step-up process terminates and the discharge cycle begins. During the discharge portion of the high frequency cycle, switching means (354) and (358) are open and switching means (366) is closed. When switching means (366) is closed, the energy stored in the EL backlight panel (140) is passively discharged by the resistor (362). This portion of the low frequency cycle provides a waveform which is an exponentially decaying wave shape with a discharge time constant which is based on the panel capacitance and the resistance value of resistor (366). The passive discharge period is terminated by an input from the frequency source (328).

At this time, the low frequency cycle repeats, with the voltage step-up process resuming as previously described. The operating low frequency is typically 60-2000 Hz, which is selected to provide optimal electroluminescent backlight panel (140) characteristics such as operating life, color, and peak panel voltage.

Figure 4:
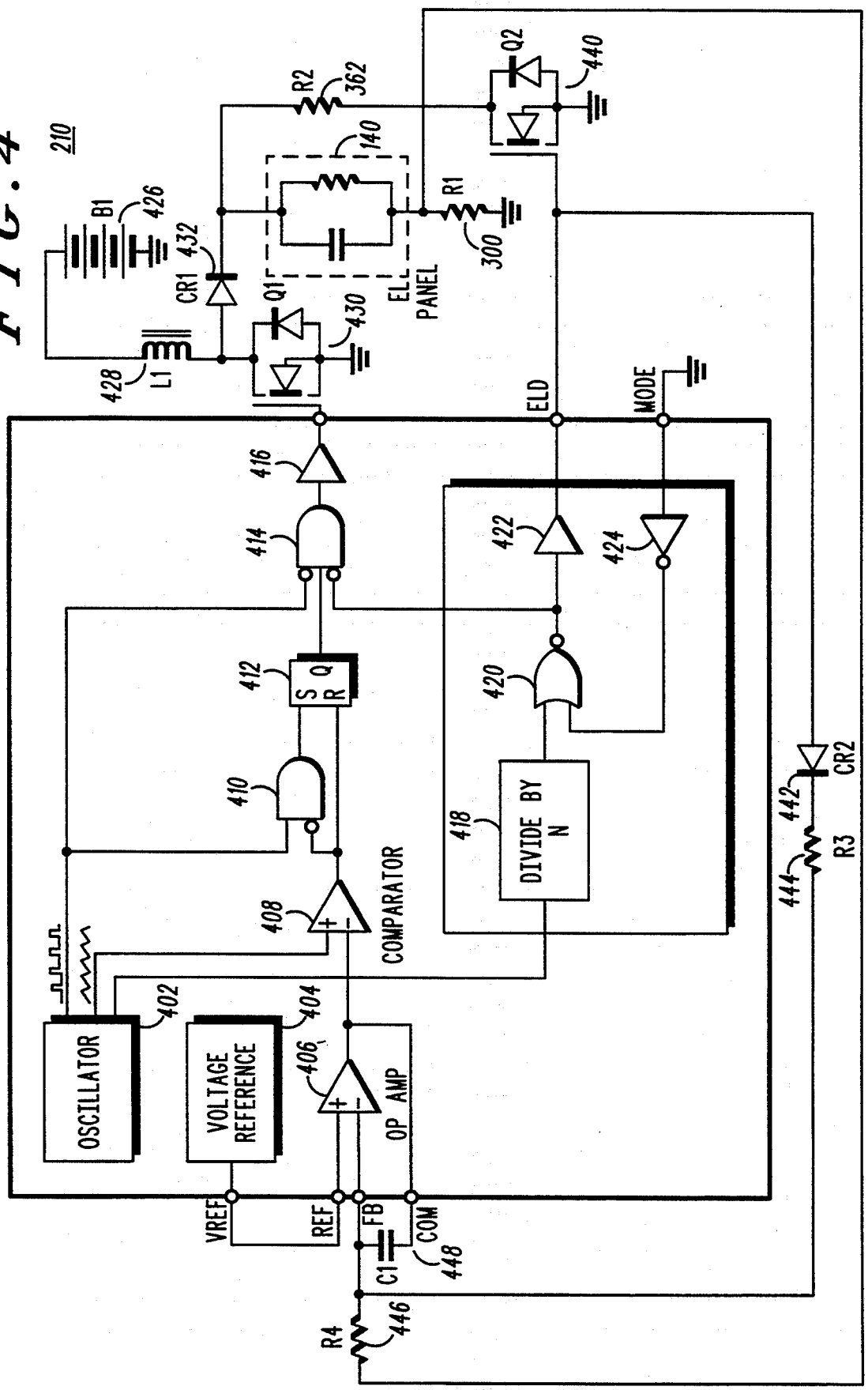
FIG. 4 shows a schematic of the driver circuit for an electroluminescent panel in accordance with a preferred embodiment of the invention.

For a more thorough description, including the relevant details, of a preferred embodiment of the present invention the reader is referred to FIG. 4. FIG. 4 shows a schematic of the driver circuit for an electroluminescent panel in accordance with a preferred embodiment of the invention. The PWM circuit (332) and the Frequency Sources (328) shown in FIG. 3 are comprised of elements internal to outline box (402), (404), (406), (408), (410), (414), (416), (418), (420), (422), and (424). These elements, along with resistors (300), (362), (444), (446), transistors (430), (440), diodes (432), (442), capacitor (448), and inductor (428) are relatively small with respect to the electronic device (100) size. It is known to those skilled in the art that all of these elements, with the exception of inductor (428) and resistor (362), can be combined into a single integrated circuit to provide a small electroluminescent backlight panel driver circuit. In addition, since inductor (428) is inversely proportional to the high frequency PWM switching frequency, its size is also relatively small with respect to the electronic device (100) size.

A study of the electrical circuit of FIG. 4. will show the operation of the DC to AC conversion of the EL backlight panel (140) driver. The gate of transistor (430)

is controlled from the buffered output of the PWM logic (414) and (416). Transistor's (430) switching "on-time" is modulated in accordance with the provided feedback means via resistors (300) and (446) to provide regulated electroluminescent backlight panel brightness. During the active step-up portion of the low frequency cycle, the PWM logic elements gate (410), flip-flop (412), and gate (414) are driven by the comparator (408) output.

The comparator (408) is used to determine the pulse width which ultimately controls transistor (430). Input for the comparator (408) is derived from two sources; a high frequency source from oscillator (402) in the form of a ramp voltage waveform and from op-amp (406). The magnitude of the output of op-amp (406) is proportional to the amount of pulse width modulation correction required to provide a regulated brightness output. This correction factor is determined by the op-amp circuit (406) by means of voltage integration accomplished by comparison of the feedback signal from resistors (300) and (446) and the voltage reference (404). Voltage reference (404) may be fixed as shown, or derived from user control, such as that provided by a variable resistor, or computer (205) control.

During the high frequency cycle, the comparator (408) continually compares the voltage ramp input signal with the op-amp (406) error output. When the ramp voltage exceeds the op-amp (406) output, the comparator (408) output changes in the positive voltage direction causing the transistor switching means (430) to turn off as controlled by logic elements (410), (412) and (414).

Remaining functionality of logic elements (410), (412) and (414) include providing a controlled and orderly high frequency switching cycle. The connection of these logic elements are shown to provide this feature as in other PWM based systems.

The oscillator (402) provides the high frequency signal, including pulse and ramp voltage waveforms as previously described. The oscillator (402) also provides the reference for the low frequency source which is used to derive the panel drive frequency generator output. Using the high frequency oscillator (402) as a reference, the low panel drive frequency may be derived by a simple ripple counter providing a "divide by N" function. The divided frequency is equal to the source frequency divided by $2^N$ where N is number of stages of the ripple counter. Alternately, the panel drive frequency generator may be implemented by an independent non-phase lock frequency source.

Logic elements (420), (414) are controlled at the low frequency rate by the output of the divide-by-N circuit (418) output. These elements provide an output to transistor (440) via buffer (422) to define the passive discharge period of the low frequency electroluminescent backlight panel (140) driver. The enable input to logic gate (414) from logic element (420), when disabled, insures that transistor (430) is off during the passive discharge period. The logic device (424) provides a means of disabling the low frequency passive discharge portion of the cycle to allow the PWM circuit to be applied in circuits other than described in this disclosure.

The output of buffer (422) which is controlled at the low frequency rate of the electroluminescent backlight panel (140) frequency is applied to diode (442) and resistor (444) which is in turn applied to the op-amp (406) inverting input. The output of the buffer is "high" or active driving the passive discharge portion of the low frequency cycle. This causes the diode (442) to be forward biased and in its conduction region and the output from the buffer to be applied to the op-amp inverting input through resistor (444). In turn, the op-amp (406) error output is forced to a minimum value to insure during the passive portion of the low frequency cycle that the modulated pulse train is disabled. In addition, the disabling circuit feedback means, diode (442) and resistor (444), insures that the beginning of the active high frequency portion of the step-up switching cycle is executed in an orderly controlled fashion. In effect, the feedback means acts to reset the initial state of the PWM circuit. The diode (442) may also be implemented as a synchronous switching means controlled by the output waveform of the logic device (420) thus providing an alternate circuit topology.

The transistor (430) is used to control the amount of current which is received from the power source (426) and stored in the inductor (428) during the first portion of each high frequency cycle. The means for storing magnetic energy in FIG. 4, i.e. the inductor (428), has been configured as a "boost" step-up converter. Alternately, it is known that a similar circuit configuration may be used implementing a transformer which will allow the PWM voltage conversion to operate in the "flyback" mode of operation. Either the boost or flyback configuration may be used giving the designer of the circuit a choice of either an inductor (428) or transformer to meet the electrical needs of the circuit and comply with the electrical requirements of the electroluminescent backlight panel (140).

The output of the inductor (428) is applied to the electroluminescent backlight panel (140) via diode (432) after the transistor (430) is opened during the high frequency switching cycle. The diode (432) provides a current path from the inductor to the electroluminescent backlight panel (140), but disallows current from the electroluminescent backlight panel (140) from discharging into either transistor (430) or inductor (428). The current provided from inductor (428) flows through the electroluminescent backlight panel (140) and terminates to circuit ground through resistor (300). The voltage induced across resistor (300) which is proportional to the panel current is fed back to the op-amp (306) inverting input to provide a regulating means. During the passive discharge portion of the low frequency cycle, transistor (440) is on. The energy stored in the electroluminescent backlight panel (140) is passively dissipated in resistor (362).

Appreciation of the operation of a preferred embodiment of the instant invention will be facilitated by a description of the FIG. 4 driver circuit timing. The description refers to and describes the FIG. 5 timing diagram in conjunction with the FIG. 6 timing diagram.

The voltage waveform (500) of FIG. 5 is provided across the electroluminescent backlight panel (140), being the output of the cathode of diode (432) shown in FIG. 4. The period of waveform (500) is determined by the voltage waveform which is present on the gate of transistor (440) of FIG. 4. This is shown on waveform (590). From time (540) to time (550) is the active rising portion of the waveform (500) and time (550) to time (560) is the passive decaying portion, together comprising the waveform that drives EL panel (140).

During the rising portion (510) of the waveform (500), the high frequency process is active causing the shown voltage ramp (510) to occur. The amplitude of the waveform (500), shown by line (530), is typically many times in amplitude of the original power source (426), usually a DC battery. As an example, the battery voltage may be 6 VDC and the required peak AC amplitude of the waveform (500) may be 200 V P-P.

During the passive decaying portion (520), waveform (500) is controlled again by the voltage waveform which is present on the gate of transistor (440) of FIG. 4, indicated by the non-zero portion (570) of waveform (590). The peak amplitude of the waveform (500) is gradually decreased to the initial value of the active ramp (510). It is important to note that the waveform (500) does not, at any time, fall below the circuit ground voltage value, which is indicated by 0 Volts on the amplitude scale.

Shown in FIG. 6 is an expanded view of voltage waveform (500) of FIG. 5 during the active portion (510). Voltage waveform (600) shows voltage "spikes" (610) which were not visible in voltage waveform (500) because the voltage scale was much greater in magnitude. The spikes (610) of waveform (600) are produced by the flow of current which is released from the inductor (428) into the electroluminescent backlight panel (140). The amount of energy stored in inductor (428) is determined by the "on" time period (650) of waveform (640). The "on" time period (650) is between time (620) and time (630) and is controlled by the regulating PWM circuit (332). The net effect of the repeated voltage spikes (610) of waveform (600) is to step-up the original power source (426) in the form of a substantially linear ramp, when taken as an average over the time period from time (540) to time (550) of waveform (500).

Figure 7:
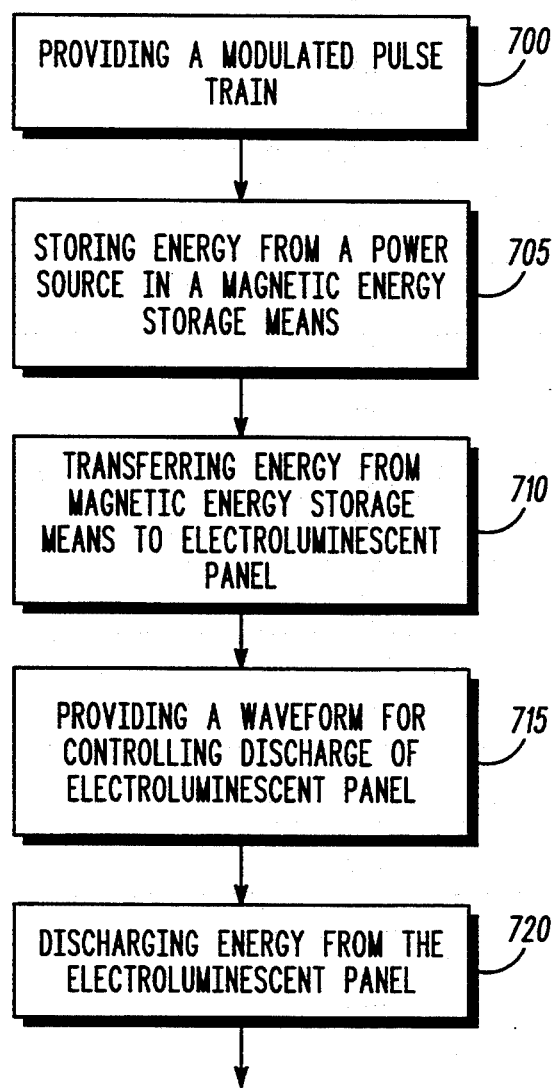
FIG. 7 is a process flow chart in accordance with a method embodiment of the present invention.

Appreciation of a method embodiment of the instant invention may be facilitated by a description of the FIG. 4 driver circuit in a first operating mode. FIG. 7 shows the steps comprising a method for controlling and converting power delivered to electroluminescent panel (140). A modulated pulse train (640) is provided in step (700) for controlling a means for storing magnetic energy (350). Next energy from a power source (20) is stored in the means for storing magnetic energy (350) in step (705). In step (710) the stored energy is transferred from the means for storing magnetic (350) energy to the electroluminescent panel (140). Steps (705-710) are repeated until a peak voltage level (530) is reached at the electroluminescent panel (140). A waveform (590) is provided for controlling the passive discharge of the electroluminescent panel (140) in step (715). Finally, in step (720), the energy is discharged from the electroluminescent panel (140) as controlled by the waveform (590).

The electroluminescent backlight panel (140) driver circuit, in accordance with a preferred embodiment of the present invention, employs a high frequency PWM voltage conversion process which has several advantages. Firstly, since a high frequency conversion (typically 100 KHz to 500 KHz) is used, the means for storing magnetic energy (350) of the boost or flyback configured converter is relatively small. As is known, the physical size of the required magnetic energy storage means (350) is inversely proportional to the switching frequency of the conversion circuit. The size of the magnetic energy storage means (350) in the DC to AC converter in many cases is the largest component of the converter. This is evident in other implementations in which the required voltage conversion takes place at the lower drive frequency of the electroluminescent backlight panel (140).

Another benefit, in accordance with a preferred embodiment of the present invention, is the means of automatically compensating the brightness of the electroluminescent backlight panel (140) over time, as the EL panel ages. Typically, for electroluminescent backlight panels, the equivalent panel capacitance decreases over the life of the device. Since the preferred embodiment of the present invention drives the effective electroluminescent backlight panel (140) directly to produce the required panel drive frequency waveform (590), and since the converter, in accordance with a preferred embodiment of the present invention, uses a feedback function (300, 446) to regulate the waveform current, all essential elements for automatic waveform adjustment are included to provide automatic brightness control.

In addition to providing automatic brightness control, a preferred embodiment of the present invention, because it is PWM based, provides a convenient means for user or computer controlled brightness adjustment. The feedback path of the waveform, as described above, is compared to a reference input of the converter. The reference input of the converter is derived from either a user control, such as a variable resistor (316), or a computer (205) set variable voltage source via a digital-to-analog converter. The preferred embodiment of the present invention operates as a closed loop system, which has been designed to adjust the waveform level by modulating the switching period, thereby making the feedback voltage equal to the reference voltage. In this manor, the brightness of the electroluminescent backlight panel is regulated based on the user or computer input.

Thus it will be appreciated by those of ordinary skill in the art that the apparatus and method disclosed provide a small, light-weight, low-cost, driver circuit for an electroluminescent backlight panel. Furthermore, the present invention satisfies the long-felt need of mobile data processing by providing a highly-readable operator interface for portable electronic devices, regardless of ambient light conditions and EL panel aging degradation.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A driver circuit for converting and controlling power to an electroluminescent panel, comprising:
    a pulse-width modulation circuit for providing a modulated pulse train, said pulse-width modulation circuit further including an enable input and a regulating means for adjusting a pulse width,
    a panel drive frequency generator, electrically coupled to said pulse-width modulation circuit, for providing a panel drive frequency, and for providing a signal to said enable input for disabling said modulated pulse train,
    a means for storing magnetic energy, electrically coupled to a power source,
    a first switching means, electrically coupled to said means for storing magnetic energy and responsive to said pulse train, for controlling said storing magnetic energy,
    a second switching means, electrically coupled to said first switching means, said means for storing magnetic energy and said electroluminescent panel, for transferring energy from said means for storing magnetic energy to said electroluminescent panel, a resistor, electrically coupled to said electroluminescent panel, for setting an electroluminescent panel discharge time constant, a third switching means electrically coupled to said resistor and responsive to said panel drive frequency generator for draining energy from said electroluminescent panel through said resistor, and feedback means, coupled to said pulse-width modulation circuit and responsive to said panel drive frequency, for resetting the initial state of said pulse-width modulation circuit.

2. The driver circuit recited in claim 1, wherein said regulating means further includes:

a voltage source for providing a reference voltage to said pulse-width modulation circuit; and a variable resistor coupled to said voltage source for adjusting an input voltage to said pulse width modulation circuit.

3. The driver circuit recited in claim 1, wherein said regulating means further includes:

a variable voltage source coupled to a computer controlled digital-to-analog converter for controlling panel brightness.

4. The driver circuit recited in claim 1, further comprising:

a second resistor electrically connected in series with said electroluminescent panel for regulating energy to said electroluminescent panel.

5. The driver circuit recited in claim 1, wherein said second switching means includes a diode.

6. The driver circuit recited in claim 5, wherein said first switching means includes a transistor.

7. The driver circuit recited in claim 6, wherein said third switching means includes a transistor.

8. The driver circuit recited in claim 1, wherein said panel drive frequency is derived from an oscillator.

9. The driver circuit recited in claim 1, wherein said feedback means includes a resistor.

10. The driver circuit recited in claim 9, wherein said feedback means further includes a diode.

11. The driver circuit recited in claim 1, wherein said means for storing magnetic energy includes a transformer.

12. The driver circuit recited in claim 1, wherein said means for storing magnetic energy includes an inductor.

13. An electronic device having an electroluminescent display panel, comprising:

a computer having a processor, a memory, a power supply, and an operator interface comprising said electroluminescent display panel, a pulse-width modulation circuit for providing a modulated pulse train, said pulse-width modulation circuit further including an enable input and a regulating means for adjusting a pulse width, a panel drive frequency generator, electrically coupled to said pulse-width modulation circuit, for providing a panel drive frequency, and for providing a signal to said enable input for disabling said modulated pulse train, a means for storing magnetic energy, electrically coupled to said power supply, a first switching means, electrically coupled to said means for storing magnetic energy and responsive to said pulse train, for controlling said storing magnetic energy, a second switching means, electrically coupled to said first switching means, said means for storing magnetic energy and said electroluminescent panel, for transferring energy from said means for storing magnetic energy to said electroluminescent panel, a resistor, electrically coupled to said electroluminescent panel, for setting an electroluminescent panel discharge time constant, a third switching means electrically coupled to said resistor and responsive to said panel drive frequency generator for draining energy from said electroluminescent panel through said resistor, and feedback means, coupled to said pulse-width modulation circuit and responsive to said panel drive frequency, for resetting the initial state of said pulse-width modulation circuit.

14. The driver circuit recited in claim 13, wherein said regulating means further includes:

a voltage source for providing a reference voltage to said pulse-width modulation circuit; and a variable resistor coupled to said voltage source for adjusting an input voltage to said pulse-width modulation circuit.

15. The driver circuit recited in claim 13, further including:

a second resistor electrically connected in series with said electroluminescent panel for regulating energy to said electroluminescent panel.

16. The driver circuit recited in claim 13, wherein said second switching means includes a diode.

17. The driver circuit recited in claim 16, wherein said first switching means includes a transistor.

18. The driver circuit recited in claim 17, wherein said third switching means includes a transistor.

19. The driver circuit recited in claim 13, wherein said panel drive frequency is derived from said pulse-width modulation circuit.

20. The driver circuit recited in claim 13, wherein said feedback means includes a resistor.

21. The driver circuit recited in claim 20, wherein said feedback means further includes a diode.

22. The driver circuit recited in claim 13, wherein said means for storing magnetic energy includes a transformer.

23. The driver circuit recited in claim 13, wherein said means for storing magnetic energy includes an inductor.

* * * * *